(12) United States Patent
Galich

(10) Patent No.: US 6,376,925 B1
(45) Date of Patent: Apr. 23, 2002

(54) FORCE STAND FOR ELECTRICAL ENERGY PRODUCING PLATFORM

(76) Inventor: Thomas P. Galich, 24962 Sea Crest Dr., Dana Point, CA (US) 92629

( * ) Notice: Subject to any disclaimer, the term of this patent is extended or adjusted under 35 U.S.C. 154(b) by 42 days.

(21) Appl. No.: 09/634,042

(22) Filed: Aug. 8, 2000

Related U.S. Application Data

(63) Continuation-in-part of application No. 09/437,030, filed on Nov. 9, 1999, which is a continuation-in-part of application No. 09/166,691, filed on Oct. 5, 1998, now Pat. No. 6,091,159.

(51) Int. Cl.$^7$ ............................................. H02K 35/00
(52) U.S. Cl. ........................................ 290/1 R; 290/45
(58) Field of Search ................................ 290/1 R, 1 A, 290/1 E, 54; 60/45, 398; 310/12, 13

(56) References Cited

U.S. PATENT DOCUMENTS

| | | | |
|---|---|---|---|
| 2,020,361 A | 11/1935 | Johnston | 230/216 |
| 3,696,251 A | 10/1972 | Last et al. | 290/53 |
| 4,081,224 A | 3/1978 | Krupp | 417/229 |
| 4,212,598 A | 7/1980 | Roche et al. | 417/229 |
| 4,239,974 A | * 12/1980 | Swander et al. | 290/1 R |
| 4,239,975 A | 12/1980 | Chiappetti | 290/1 R |
| 4,339,920 A | 7/1982 | Le Van | 60/533 |
| 4,409,489 A | 10/1983 | Hayes | 290/1 R |
| 4,418,542 A | 12/1983 | Ferrell | 60/668 |
| 4,532,431 A | 7/1985 | Iliev | 290/4 R |
| 4,614,875 A | 9/1986 | McGee | 290/1 R |
| 4,700,540 A | 10/1987 | Byrum | 60/325 |
| 4,739,179 A | 4/1988 | Stites | 290/1 R |
| 4,924,123 A | 5/1990 | Hamajima | 310/15 |
| 4,980,572 A | 12/1990 | Sen | 290/1 R |
| 5,157,922 A | 10/1992 | Baruch | 60/325 |
| 5,355,674 A | 10/1994 | Rosenberg | 60/325 |
| 5,570,286 A | 10/1996 | Margolis | 364/424.05 |
| 5,634,774 A | 6/1997 | Angel | 417/229 |
| 6,091,159 A | * 7/2000 | Galich | 290/1 R |
| 6,172,426 B1 | * 1/2001 | Galich | 290/1 R |
| 6,204,568 B1 | * 3/2001 | Runner | 290/1 R |

* cited by examiner

Primary Examiner—Nicholas Ponomarenko
(74) Attorney, Agent, or Firm—Stetina Brunda

(57) ABSTRACT

A force stand for an energy platform system which is operative to generate electrical energy from the weight of a moving vehicle. The force stand comprises a vertical beam and an electricity producing stage moveably attached thereto. The translation of the stage on the beam is operative to produce electrical energy. The force stand further comprises a drive assembly mechanically coupled to the stage and the energy platform. The drive assembly is configured to translate the stage upwardly on the beam as the vehicle moves over the energy platform system and translate the stage downwardly when the vehicle is not moving over the energy platform system. In this respect, the stage produces electricity as it is moved both upwardly and downwardly on the vertical beam in order to produce a constant flow of electricity. In the preferred embodiment, the drive assembly may be either a hydraulic cylinder or a scissor lift operative to translate the stage upwardly. The stage is translated downwardly by the weight of stage.

14 Claims, 6 Drawing Sheets

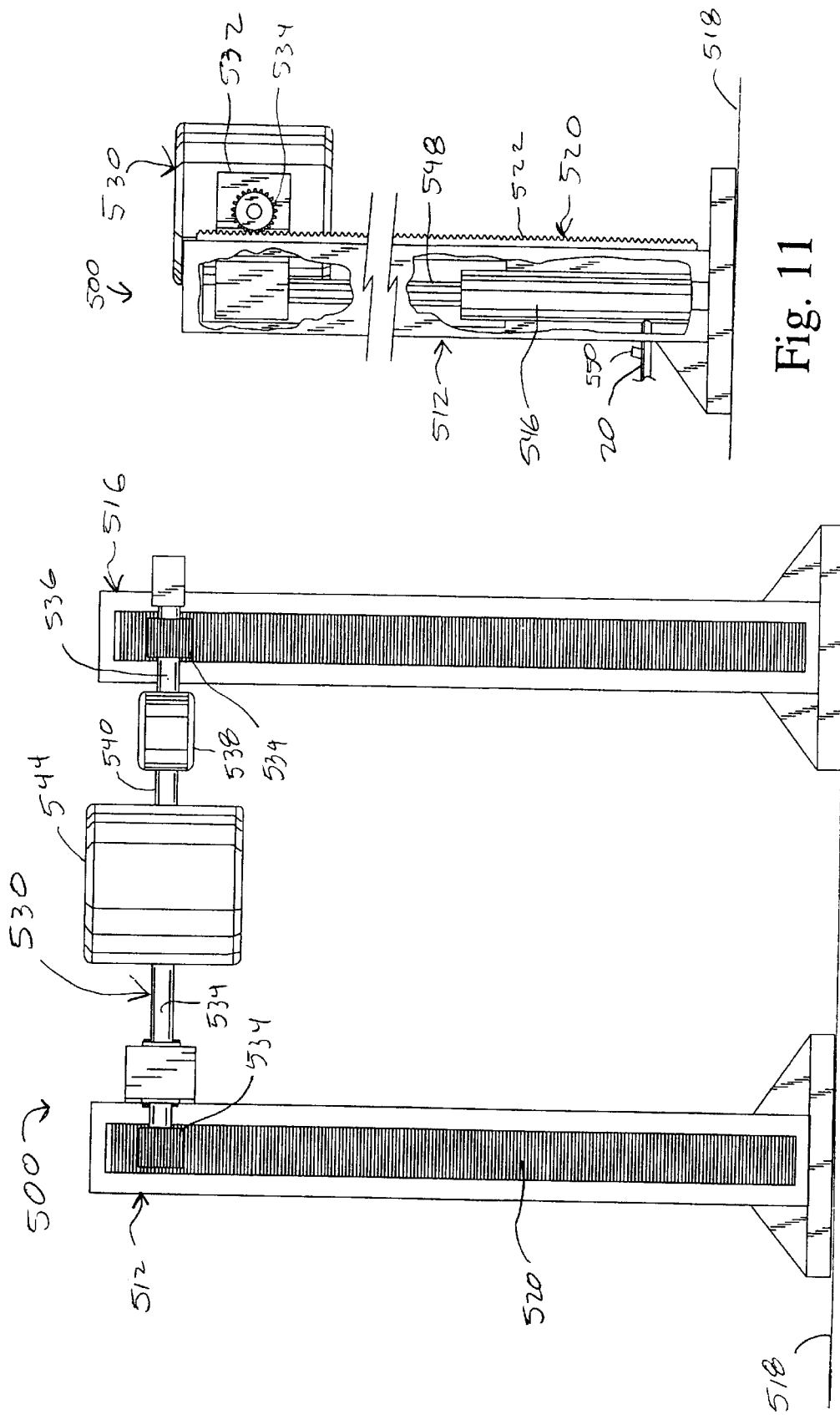

FORCE STAND FOR ELECTRICAL ENERGY PRODUCING PLATFORM

CROSS-REFERENCE TO RELATED APPLICATIONS

The present application is a continuation-in-part of U.S. application Ser. No. 09/437,030 entitled ELECTRICAL ENERGY PRODUCING PLATFORM AND METHOD OF USE filed Nov. 9, 1999, which is continuation-in-part of U.S. application Ser. No. 09/166,691 entitled ELECTRICAL ENERGY PRODUCING PLATFORM AND METHOD OF USE filed Oct. 5, 1998, U.S. Pat. No. 6,091,159 the disclosures of which are expressly incorporated herein by reference.

BACKGROUND OF THE INVENTION

The present invention generally relates to electrical energy generation and more particularly to the storage of electrical energy produced from the existing motion and weight of a moving vehicle.

Currently fossil fuels or hydrocarbons are the main source of fuel for electrical energy generation. However, these fuels are non-renewable and eventually their supply will be exhausted. Therefore, in order to make the supply of non-renewable fossil fuels last longer, alternative energy sources have been and are being developed.

However, such alternatively energy sources have not met with widespread acceptance because of their complexity and/or associated high costs. For example, solar or ocean power generation of electricity produces a clean and constant source of electricity yet is expensive an costly to develop.

Geothermal energy is also a clean and low cost source of energy that has been used in small amounts for centuries. The technology has been developed to utilize geothermal energy such that it is economical to use. However, the main drawback to geothermal energy is that it is dependent upon location and not available throughout the world.

A major supplier of renewable energy is harnessing the power of streams and dams to thereby generate electricity. However, the future of this type of electrical power generation depends on overcoming a number of environmental, regulatory and political obstacles. A number of federal laws restrict the development of dams and electrical power generating facilities that would destroy the natural character of a region. Therefore, construction of new dams and power generating facilities face government and regulatory agency scrutiny that currently curtail development.

Another source of alternative energy has been the wind which has been used as a source of power generation for centuries. Generation of power from the wind reached its peak in the late nineteenth and twentieth centuries, however it is still not a significant source of energy. A primary reason for the lack of development of using wind as an energy source is due to the inconsistency of the wind and the need to store the electricity produced therefrom until there is a sufficient demand.

In addition to the above-mentioned sources of alternative energy, nuclear power is also use for the generation of electricity. However, nuclear power is controversial due to the radioactive nuclear waste produced as a by-product from the generation of electricity and the problems associated with disposal. Similarly, even the production of electricity from fossil fuels is controversial because of the waste and smog produced from the burning of hydrocarbons.

Furthermore, there have been numerous attempts to derive electricity from the movement of vehicles. Such methods include the use of mechanical systems whereby the movement of the vehicle will produce electricity. However, such systems are inherently deficient in the fact that they do not create a constant stream of electrical energy. Specifically, the vehicles driving over such systems are intermittent such that the source of power is not constant. Accordingly, there has been no commercial success yet with such systems.

Therefore, there exists a need for an electrical power generating system that can produce and store energy in a clean and efficient manner and yet does not further deplete the diminishing source of hydrocarbon based fuels. The present invention addresses the above-mentioned deficiencies by utilizing the untapped and free movement of already moving vehicles to thereby produce and store a constant source of electrical energy.

BRIEF SUMMARY OF THE INVENTION

A force stand for an energy platform system which is operative to generate electrical energy from the weight of a moving vehicle. The force stand comprising a vertical beam and an electricity producing stage moveably attached to the beam. The translation of the stage along the beam is operative to produce electrical energy. The force stand further comprises a drive assembly mechanically coupled to the stage and the energy platform system. The drive assembly is configured to translate the stage upwardly on the beam as the vehicle moves over the energy platform system and then translate the stage downwardly when the vehicle is not moving over the energy platform system. In this respect, the stage produces electricity when moving both upwardly and downwardly on the vertical beam such that a constant flow of electricity is produced.

In accordance with the preferred embodiment of the present invention, the drive assembly may be a hydraulic cylinder mechanically coupled to the stage such that as the vehicle moves over the energy platform system, hydraulic fluid is compressed and drives a piston rod of the hydraulic cylinder upwardly to move the stage. Alternatively, the drive assembly may be a scissor lift. In this respect, the scissor lift will comprise a hydraulic cylinder mechanically coupled thereto and operative to extend the scissor lift. Accordingly, as the vehicle drives over the energy platform system, hydraulic fluid will be pressurized and drive a piston rod of the hydraulic cylinder which will extend the scissor lift. In either instance (i.e., hydraulic cylinder or scissor lift), when a vehicle is not driving over the energy platform system, a relief valve will release hydraulic fluid from the hydraulic cylinder such that the electricity producing stage will move downwardly on the beam and produce electrical energy.

In the preferred embodiment of the present invention, the electricity producing stage comprises a gear mechanism mechanically coupled to the vertical beam and a generator attached to the gear mechanism. The generator is operative to produce electricity from the movement of the gear mechanism. In this respect, the gear mechanism will include a gear mechanically coupled to the vertical beam and a gear box disposed between the gear and the generator such that as the stage translates upwardly and downwardly on the vertical beam, the gear will rotate and thereby turn the generator via the gear box. In order to rotate the gear, the vertical beam may comprise a gear rack which is cooperatively engageable to the gear. As will be recognized by those of ordinary skill in the art, the gear rack comprises a set of teeth which are formed complimentary to teeth of the gear such that the gear will rotate by translation of the stage.

In accordance with the present invention there is provided a method of storing energy with a force stand from an energy platform system. The energy platform system is operative to pressurize fluid from the weight of a moving vehicle. The method comprises driving the vehicle over the energy platform system in order to pressurize the fluid. Next, an electrical producing stage of the force stand is translated upwardly on a vertical beam by the pressurized fluid. As the stage moves upwardly, electricity is generated therewith. When a vehicle is not driven over the energy platform system, the stage is translated downwardly such that electricity will be generated by the downward movement of the stage along the vertical beam. In the preferred embodiment, the process of producing electrical energy is repeated as multiple vehicles drive over the energy platform system.

BRIEF DESCRIPTION OF THE SEVERAL VIEWS OF THE DRAWING

These as well as other features of the present invention, will become more apparent upon reference to the drawings wherein:

FIG. 10 is a front elevational view of a force stand constructed in accordance with the present invention;

FIG. 11 is a side elevational view of the force stand shown in FIG. 10;

DETAILED DESCRIPTION OF THE INVENTION

Figure 1:
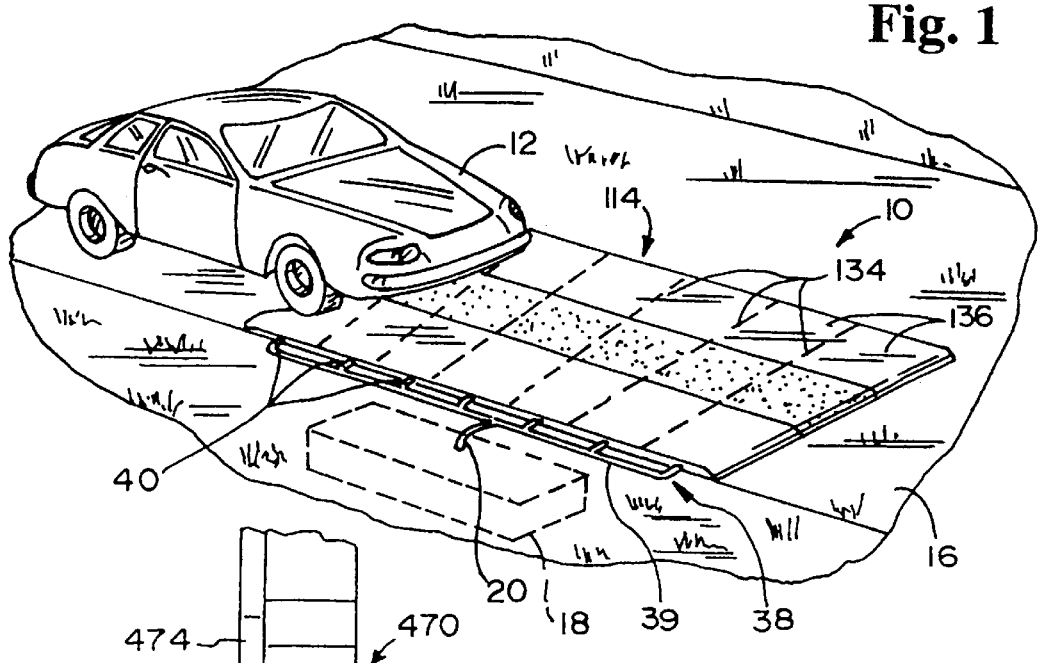
FIG. 1 is a perspective view of an electrical energy producing platform system constructed in accordance with a first embodiment and illustrating the manner in which electrical energy is produced by the passage of a vehicle thereover.

Referring now to the drawings wherein the showings are for purposes of illustrating preferred embodiments of the present invention only, and not for purposes of limiting the same, FIG. 1 is a perspective view of an electrical energy producing platform system 10 constructed in accordance with a first embodiment and used to generate electrical energy from the weight and movement of a vehicle 12. The system 10 comprises a bladder 114 or fluid bed upon which a vehicle 12 is driven over. In the first embodiment as shown in FIG. 1, the bladder 114 retains a volume of hydraulic-fluid and is fabricated from a highly durable material that can take the abuse of being driven over by motorized vehicles. In addition to being durable, the preferred material from which the bladder 114 is constructed is resilient or elastic such that after the bladder 114 is compressed from the weight of vehicle 12, it reassumes its original shape and volume after the vehicle 12 has driven thereover.

The bladder 114 is placed on the surface of a road 16 such that vehicles 12 must drive over the bladder 114. Ideally, the bladder 114 is adaptable to be placed on existing vehicle arteries and especially on freeway on-ramps and off-ramps or other high vehicular travel routes such as ingress or egress routes to shopping malls, parking lots, or the like. The bladder 114 is compressed from the weight of vehicle 12 as it drives over bladder 114 to thereby pressurize and provide a "prime mover" force onto the hydraulic fluid contained therein. Therefore, the "prime mover" is the motion and weight of a vehicle passing over the system 10 to thereby initiate a fluid pumping action that will be used with a hydraulic system to convert the energy of the "prime mover" into mechanical energy.

Figure 2:
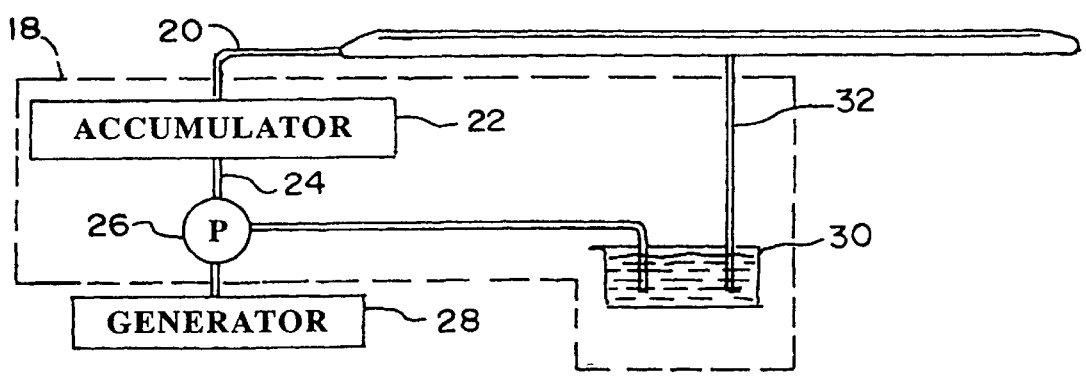
FIG. 2 is a block diagram of the platform system shown in FIG. 1.

Specifically, FIG. 2 shows a circulation assembly 18 wherein the compression of bladder 114 forces the pressurized hydraulic fluid through a first conduit 20. Attached to first conduit 20 is an accumulator 22 for receiving and releasing the pressurized hydraulic fluid at a prescribed pressure level. Therefore, hydraulic fluid is released from the accumulator 22 through a second conduit 24 to a hydraulic pump 26. The hydraulic pump 26 converts the energy from the circulating hydraulic fluid into mechanical energy as is currently known in the art. Therefore, an electrical generator 28 cooperatively engaged to pump 26 is powered from the mechanical energy produced by pump 26 to thereby produce electrical energy. The electrical generator 28 is metered on line into existing electrical energy transport carrier lines in order to distribute the electricity to areas where needed. As such, the present invention can provide a source of clean electrical energy from the weight and movement of vehicle 12 driven over bladder 114.

Figure 9:
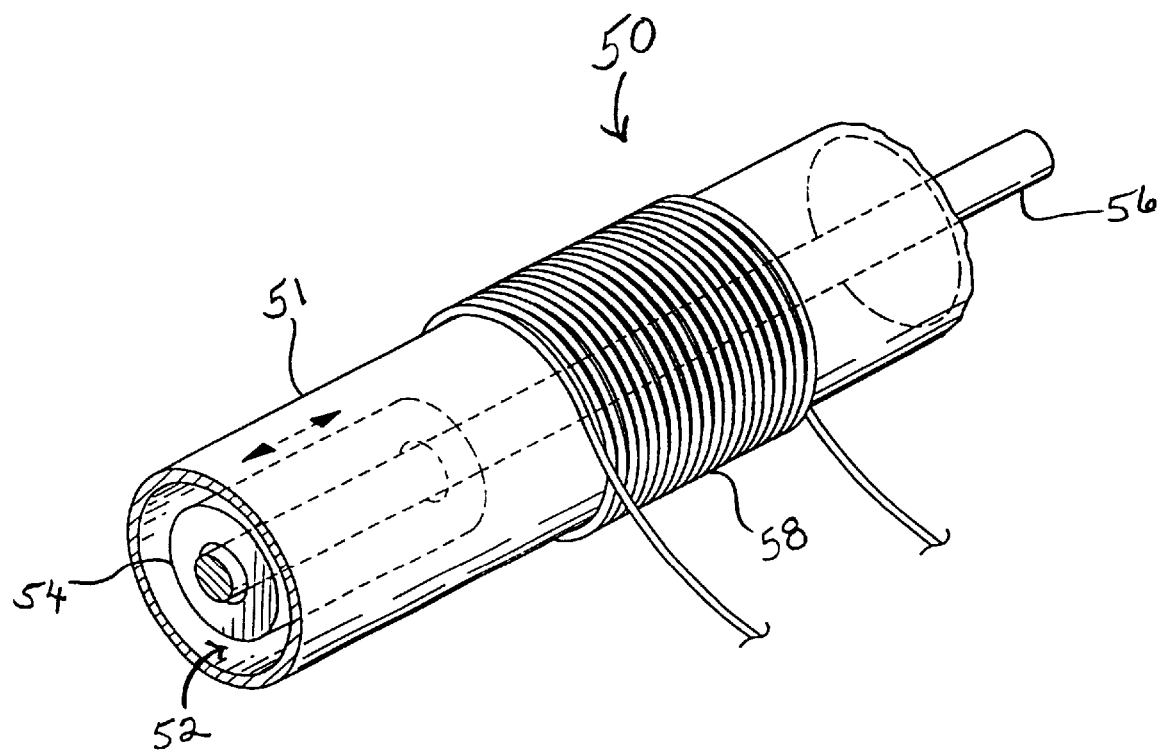
FIG. 9 is a perspective view of a linear generator used with the electrical energy producing platform system.

The generator 28 may be a linear generator 50 that produces electricity from the mechanical energy of pump 26. As seen in FIG. 9, the linear generator 50 is an elongate, tubular cylinder 51 having a hollow interior 52. Disposed within the hollow interior 52 is a cylindrical magnet 54 slidably disposed along an elongate rod 56. The elongate rod 56 centers the magnet 54 within the cylinder 51 and allows the magnet 54 to slide axially therein. Wound about the exterior of the cylinder 51 is a coil 58 of electrically conducting wire. Accordingly, the magnet 54 induces a current within the coil 58 as it is slidably moved along rod 56.

The pump 26 may be mechanically coupled to the magnet 54 in order to move the same within the cylinder 51 of the linear generator 50. Alternatively, the pump 26 may produce a reciprocating motion that rocks the cylinder 51 and slides the magnet 54 along the rod 56. Specifically, the pump 26 may be mechanically coupled to the cylinder 51 such that the cylinder 51 is rocked in a see-saw manner which slides the magnet 54 along rod 56. The movement will be reciprocating such that once the magnet 54 has been moved toward one end of the cylinder 51, the cylinder 51 will then be moved in an opposite direction such that the magnet 54 will slide toward the other end. The magnet 54 induces an electrical current in the coil 58 from the movement therefrom to produce electrical energy.

Additionally, the circulation assembly 18 comprises a reservoir 30 to return the hydraulic fluid from the pump 26 through a third conduit 32 back to bladder 114. Hydraulic fluid is returned to the bladder 114 through a suction action that is created when bladder 114 returns to its original shape after a vehicle 12 has compressed bladder 114.

The bladder 114 is preferably fabricated with a plurality of cell walls 134 dividing bladder 114 into a plurality of compartments or cells 136. Attached to bladder 114 is manifold 38 comprising a primary manifold segment 39 having multiple secondary manifold segments 40 extending perpendicularly therefrom. Each individual cell 136 will be fluidly connected to the primary manifold segment 39 of manifold 38 via a respective secondary manifold segment 40. In order for proper operation, there will be a check valve in each secondary manifold segment 40 to prevent pressurized hydraulic fluid from flowing back into any uncompressed cells 136 of the bladder 114. The manifold 38 is connected to circulation assembly 18 through first conduit 20 to thereby produce electrical energy as previously described. Additionally, a plurality of individual bladders 114 may also be fluidly connected to the manifold 38 through respective ones of the secondary manifold segments 40 such that the plurality of bladders 114 function cooperatively to pressurized and circulate the hydraulic fluid to pump 26.

As will be recognized, a single bladder 114 may be used individually. As shown in FIG. 2, a single bladder 114, without cells 136, is used for pressurized and circulating the hydraulic fluid. As such, a single bladder 114 will be directly coupled to accumulator 22 through first conduit 20 without the use of a manifold 38. Therefore, a single bladder 114 can produce electrical energy with circulation assembly 18 as previously described above.

As will be recognized, the system 10 provides a source of energy from the movement of trucks and automobiles. The system 10 therefore takes advantage of the free source of energy from vehicles already moving to their intended destinations. Therefore, the system 10 does not deplete the dwindling supply of hydrocarbon fuels because when the bladder 114 is placed upon an existing roadway or artery, it will utilize the free source of energy from vehicles already driving on the road. Additionally the system 10 can be placed on highways already owned and operated by the state or federal government thereby negating the need for purchasing property. As such, system 10 provides a clean source of electrical energy generation from one of the major sources of pollution into the atmosphere during the $20^{th}$ century, namely the automobile with an internal combustion engine.

Figure 4:
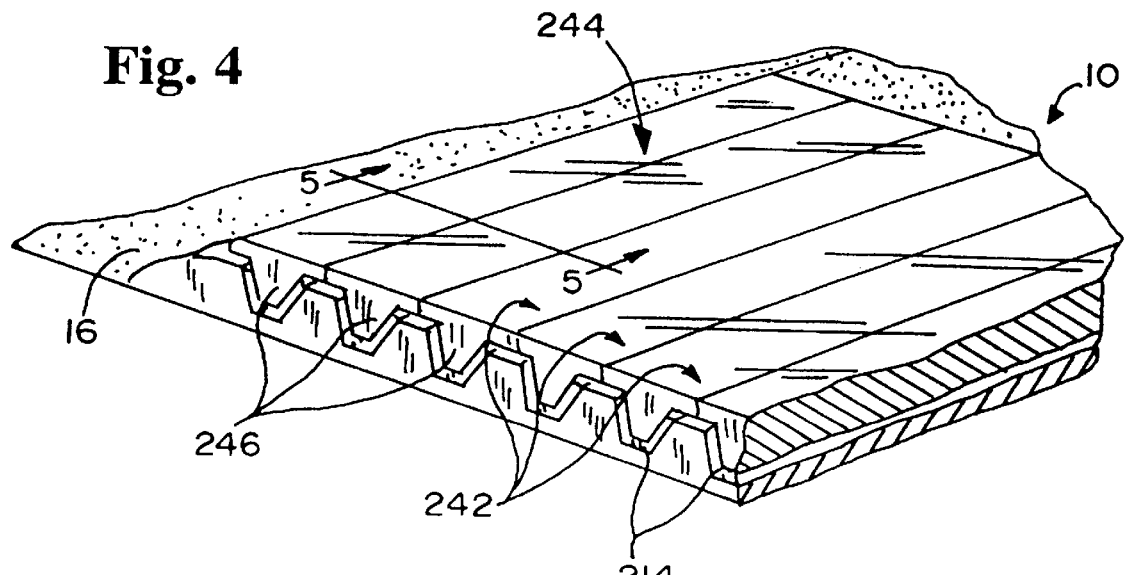
FIG. 4 is a partial perspective view of an electrical energy producing platform system constructed in accordance with a second embodiment.
Figure 5:
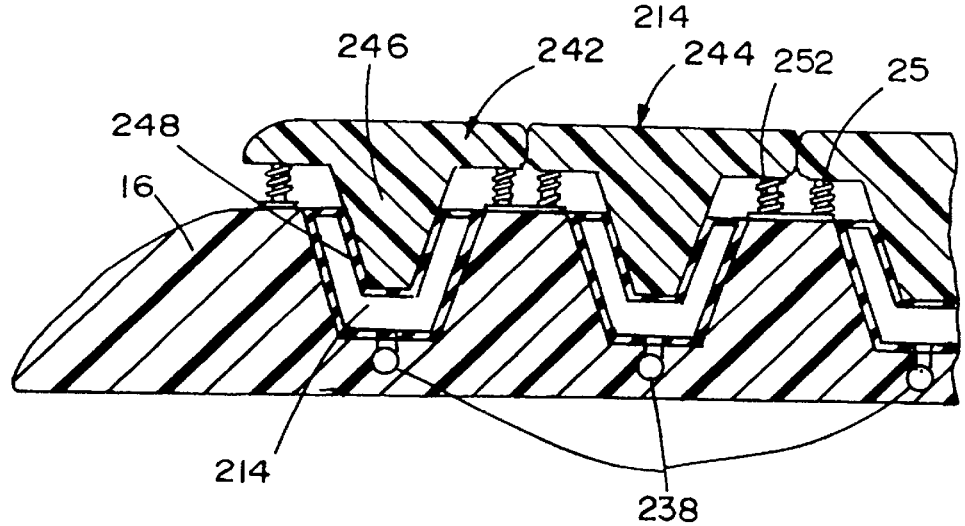
FIG. 5 is a cross-sectional view taken along line 5—5 of FIG. 4.

In accordance with a second embodiment of the system 10 and as shown in FIGS. 4 and 5, the system 10 is placed on roadway 16 and comprises a plurality of rigid metallic moveable beams 242 in contact with a plurality of respective deformable bladders 214 that contain a volume of hydraulic fluid. The bladder 214 can be fabricated from the same material as bladder 114 of the first embodiment such that bladders 114 and 214 have similar elastic and resilient properties. As best seen in FIG. 4, the plurality of generally parallel, side-by-side beams 242 form a vehicle surface 244 on which a vehicle 12 drives over. As depicted in FIG. 5, each beam 242 is formed with a generally V-shaped appendage 246 that projects downwardly from vehicle surface 244. Accordingly, a bladder 214 is formed with a generally V-shaped channel 248 that cooperatively engages the complementary V-shaped appendage 246 of a respective beam 242 positioned directly above. Therefore, appendage 246 engages channel 248 to compress bladder 214 when beam 242 is directed downwardly toward roadway 16. However, it is not necessary that beam 242 and bladder 214 have corresponding surfaces that are V-shaped. As will be recognized, the beam 242 and bladder 214 can be any shape that facilitates the compression of bladder 214 and the pressurization and circulation of a hydraulic fluid contained within bladder 214.

In order to maintain beam 242 in a prescribed horizontal position while a vehicle is driven thereover, pilot pins 250 are mechanically attached to the roadway 16 and each beam 242 to allow beam 242 to be slidably movable in a vertical direction only. For proper operation, the beam 242 must travel in a downward direction toward roadway 16 when a vehicle travels over vehicle surface 244 in order to compress bladder 214 with appendage 246. Therefore, springs 252 are mechanically attached to each beam 242 and the road 16 to normally bias beam 242 upward and away from bladder 214 when a vehicle is not being driven there over.

As can be further seen in FIG. 5 for the second embodiment of the system 10 the bladder 214 is connected to a manifold system 238 which in turn is connected to circulation assembly 18 at first conduit 20 to produce electrical energy from the pressurization and circulation of hydraulic fluid as previously described. Therefore, a plurality of beams 242 are in fluid communication with one another by manifold 238 to form system 10. In order for proper operation, the plurality of beams 242 are placed in side by side parallel relation to each other but in generally perpendicular relation to the direction of travel of vehicle 12. By using a plurality of beams 242, it is possible to generate more electrical energy from the movement of the same vehicle. Alternatively, it is also contemplated that each bladder 214 may be connected to an individual circulation assembly 18 in order to provide redundant operation in case of failure of circulation assembly 18. It will also be recognized that it is not necessary to use a plurality of beams 242 with a plurality of bladders 214 to form a system 10, but that a large single beard 242 may be used with a large single bladder 214 and a circulation assembly 18.

Figure 6:
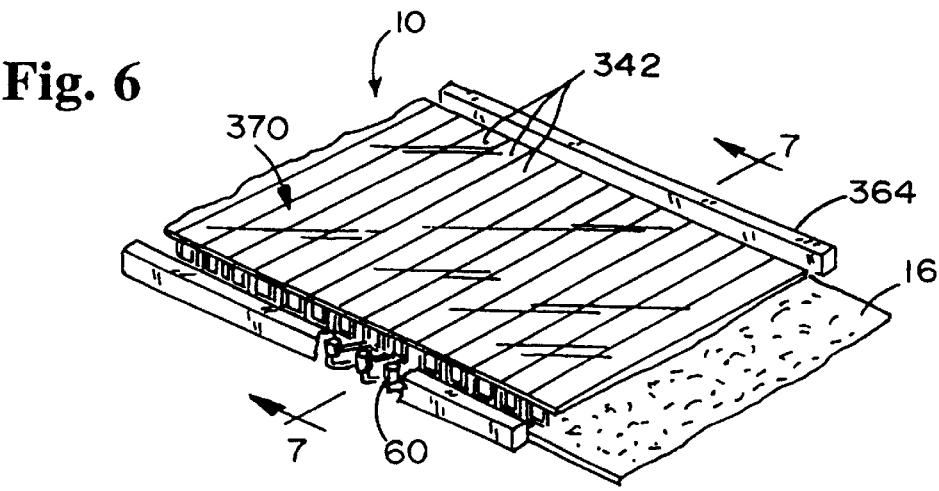
FIG. 6 is a perspective view of an electrical energy producing platform system constructed in accordance with a third embodiment.
Figure 7:
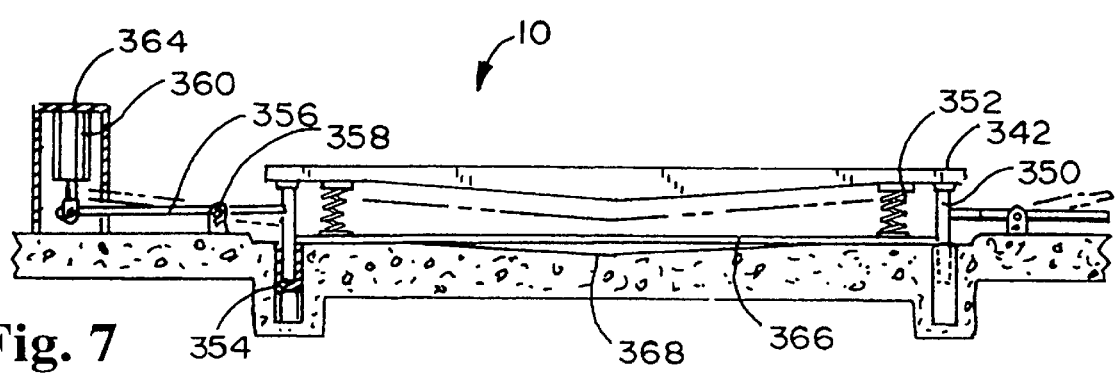
FIG. 7 is a cross-sectional view taken along line 7—7 of FIG. 6.

In accordance with a third embodiment, the system 10 comprises a plurality of rigid metallic movable beams 342, as seen in FIG. 6, to form platform 370 over which vehicle 12 is driven. The plurality of elongate beams 342 are configured in side by-side, generally parallel relation to each other and in generally perpendicular relation to, the direction of travel of vehicle 12. As seen in FIG. 7, which is a cross-sectional view of an individual beam 342 taken across line 7—7 of FIG. 6, the beam 342 is supported above roadway 16 by coil springs 352 mechanically attached to beam 342. The springs 352 normally bias the beam 342 342 in an upward direction away from roadway 16 when a vehicle is not being driven there-over. Support pins 350 mechanically attached to the bottom surface of a beam 342 maintain the horizontal position of beam 342 such that the plurality of beams 342 are in generally parallel relation to each other.

Figure 8:
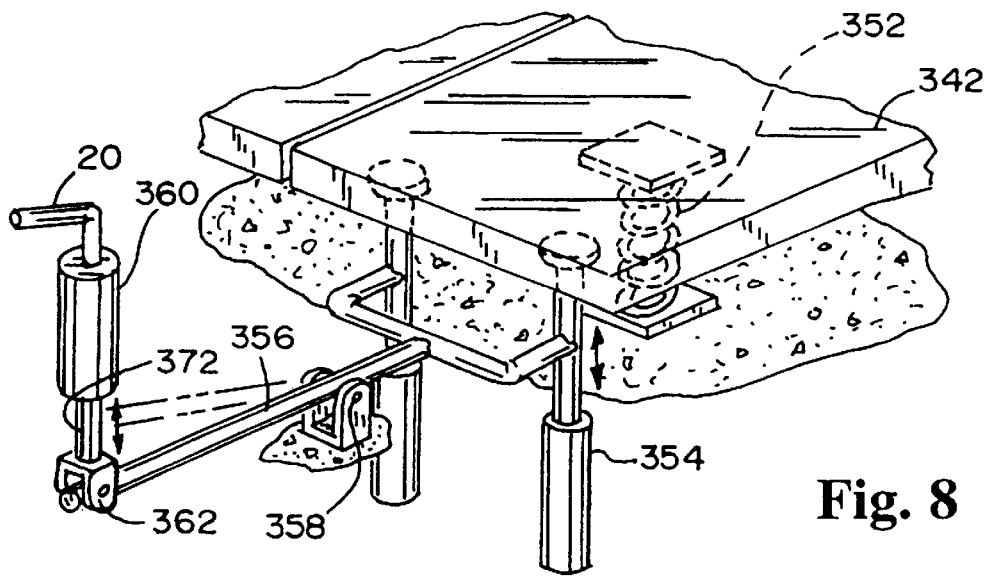
FIG. 8 is a partial perspective view of a mechanical linkage of the electrical energy producing platform system shown In FIGS. 6 and 7.

As seen in FIG. 8, each support pin 350 is slidably insertable into a respective sleeve 354 imbedded into roadway 16 which allow each beam 342 to be movable in a vertical direction only. Sleeve 354 may be filled with a fluid to facilitate the dampening of the downward movement of beam 342 as a vehicle 12 is driven thereover. Mechanically coupled to each support pin 350 is a lever arm 356 that facilitates in transferring the downward movement of beam 342. The lever arm 356 has a hinge point 358 whereby lever arm 356 pivots to transfer the movement of support pin 350 to a piston rod 372 of a hydraulic cylinder 360 via coupling 362. Therefore for proper operation of the third embodiment of the system, as beam 342 is depressed downward toward roadway 16 from the weight of a vehicle 12, the lever arm 356 will transfer this movement to the piston rod 372 of hydraulic cylinder 360. It is preferable that hydraulic cylinder 360 contain a volume of hydraulic fluid and be in fluid communication with circulation assembly 18 through first conduit 20. Therefore, as piston rod 372 is depressed into hydraulic cylinder 360, the hydraulic fluid contained therein is pressurized and forced into circulation assembly 18 through first conduit 20. As previously described, circulation assembly 18 converts the energy of the hydraulic fluid into mechanical energy to thereby produce electrical energy. Alternatively hydraulic cylinder 360 may be a pneumatic cylinder to produce compressed air which can power a generator, as will be recognized by those skilled in the art.

In the third embodiment of system 10, the beam 342 is linked to a lever arm 356 and corresponding hydraulic cylinder 360 on both sides of the roadway 16 as shown in FIG. 6 and 7. A plurality of hydraulic cylinders 360 are protected from environmental elements by a protective cover 364 that encloses the cylinders 360 and forms a curb for roadway 16. As will be recognized, a plurality of hydraulic cylinders can be interconnected to a single circulation assembly 18 by a manifold in order to power a single generator, or each hydraulic cylinder 360 may be connected to a respective individual circulation assembly 18 for redundancy of operation.

Additionally in the third embodiment, an elastic dampening gasket 366 is positioned between each beam 342 and roadway 18 in order to dampen the noise and shock of the downward movement of beam 342. As seen in FIG. 7, the bottom of beam 342 will contact the dampening gasket 366 when the beam 342 is fully depressed downward from the weight of vehicle 12. In order to allow full depression of beam 342, the roadway 16 has an indent 368 formed therein that matches the shape of the bottom surface of beam 342 such that the dampening gasket 366 can fully deform when beam 342 is fully depressed toward roadway 16. Dampening gasket 366 is fabricated from an elastic material that can dampen the downward movement of beam 342 yet will reassume its original shape after being depressed downward.

As will be recognized to those of ordinary skill in the art, the lever arm 356 of each beam 342 may be mechanically coupled to the linear generator 50. The lever arm 356 is attached to the linear generator 50 such that as the lever arm 356 is moved, the cylinder 51 is rocked in response thereto. Accordingly, the magnet 54 disposed within the cylinder 51 is slidably moved along rod 56 as previously described above. As the magnet 54 moves along the rod 56, an electrical current is produced within the coil 58. The lever arm 356 will rock the cylinder 51 in a see-saw manner such that the magnet 54 will be moved back and forth along the rod 56 to produce electrical energy.

Ideally, the system 10 may be placed on portage roads that parallel freeways or on the on-ramps or off-ramps of freeways because of the large volume of vehicles that traverse these types of high density thoroughfares. The system 10 would therefore be used in metropolitan areas with a high population and a resultant high volume of vehicular traffic in order to produce a maximum amount of electrical energy at a cost equal to or lower than other alternative sources of electrical energy. As such, system 10 would not be used in rural or low population areas where automobile usage is correspondingly low.

Freeway on-ramps are ideally suited for placement of system 10 because vehicles are beginning to accelerate onto the freeway and the driver and passengers will not mind the momentary jarring effect from the compression of a bladder or depression of a beam. Additionally, the second or third embodiments of the system 10 can be used as an extra safety measure on freeway off-ramps to slow down vehicles as they exit. If the second or third embodiments of system 10 are placed at a freeway off-ramp, the movement of beam 242 or 342 can be adjusted to cause an excessive jarring motion in the vehicle driven thereover to cause the driver of the vehicle to slow down. Therefore, the second and third embodiments can be used as "speed bumps" to slow down vehicles exiting a freeway that are capable of producing electrical energy.

It will be recognized that, in locations where the system 10 is powered by the movement of automobile 12, energy is only produced while the automobile 12 is rolling over the system 10. In this respect, there are periods of time whereby electricity will not be produced (i.e., when a vehicle is not traveling over the system 10). Accordingly, there is a need for a device which stores the mechanical energy produced by the vehicle 12 such that a constant supply of electricity may be produced by the system 10. Referring to FIG. 10, a force stand 500 used for storing the mechanical energy produced by the automobile 12 is shown. The forced stand 500 includes a first vertical beam 512 and a second vertical beam 516 disposed in substantially parallel relation thereto. The first and second vertical beams 512,516 are supported by and extend generally upwardly from ground 518. In the preferred embodiment, the first and second vertical beams 512, 516 are formed from a metallic material. Referring to FIGS. 10 and 11, the first vertical beam 512 is formed with a gear rack 520 formed on one longitudinal side thereof. Specifically, the gear rack 520 is a series of teeth 522 formed along the length of the first vertical beam 512. The gear rack 520 may be integrally formed on the vertical beam 512, or may be attached thereto, as desired.

Figure 12:
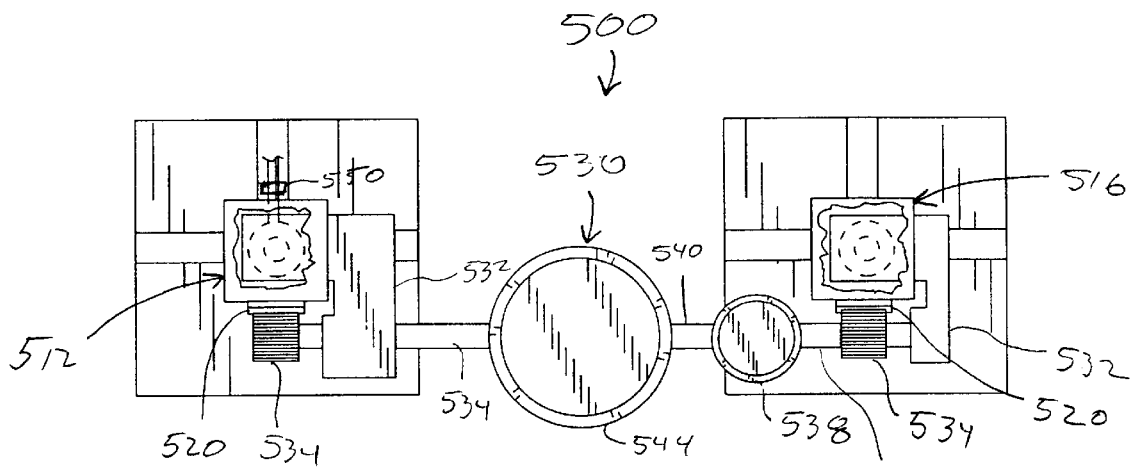
FIG. 12 is a top plan view of the force stand shown in FIG. 10.

The first and second vertical beams 512,516 support an energy producing platform (stage) 530, as seen in FIG. 10. The platform 530 is positioned between the first and second vertical beams 512, 516 and can travel upwardly and downwardly thereon. The platform 530 includes a generally L-shaped support member 532, as seen in FIG. 12. The L-shaped support member 532 extends within the interior of the first vertical beam 512 or the second vertical beam 516. In this respect each L-shaped support member 532 supports the energy producing platform 530 on respective first and second vertical beams 512 and 516.

The platform 530 includes two drive gears 534 cooperatively engaged to a respective support member 532 and the teeth 522 of gear rack 520. In this respect, the drive gears 534 is rotatably engaged to a respective support member 532 and can engage teeth 522 on respective first and second vertical beams 512 and 516. Accordingly, as seen in FIGS. 10 and 11, as the platform 530 is moved upward or downward, the drive gears 534 will be forced to rotate by the engagement with gear rack 520.

The drive gears 534 is attached to a drive shaft 536, as seen in FIG. 10. In the preferred embodiment, the drive shaft 536 is typically supported by a support strut and/or bearing (not shown). In this respect, the drive shaft 536, as well as the drive gears 534, are supported on the platform 530. The drive shaft 536 couples the drive gears 534 to a gear box 538. The gear box 538 comprises a series of gears operative to convert the torque from the drive gears 534 into desired rotation. The gear box 538 has an output shaft 540 coupled to generator 544. The generator 544 is an electrical generator operative to produce electricity from the rotation of output shaft 540. In this respect, the rotation of the drive gears 534 from the movement of the platform 530 upwardly and downwardly upon first and second vertical beams 512, 516 will rotate the output shaft 540 of the generator 544 via gear box 538. As will be recognized by those of ordinary skill in the art, the movement of the platform 530 either upwardly or downwardly is operative to generate electricity via generator 544.

In order to move the platform 530 upwardly, the force stand 500 includes at least one hydraulic cylinder 546, as seen in FIGS. 11 and 12. The hydraulic cylinder 546 contains a volume of hydraulic fluid and is in fluid communication with circulation assembly 18 of the system 10. In this respect, first conduit 20 of the system 10 forces hydraulic fluid into hydraulic cylinder 546, such that piston rod 548 will move outwardly from hydraulic cylinder 546 (i.e., upwardly). More specifically, the hydraulic cylinder 546 is located in generally parallel relationship to the first vertical beam 512 such that the movement of piston rod 548 will translate the platform 530 along first vertical beam 512. Accordingly, the piston rod 548 of hydraulic cylinder 546 is mechanically coupled to the platform 530 such that as the hydraulic cylinder 546 is filled with hydraulic fluid, the platform 530 will move upwardly along first and second vertical beams 512, 516. As the platform 530 is moved upwardly along first and second vertical beams 512, 516, the generator 544 will produce electrical energy, as previously explained above.

After the vehicle has driven over the system 10 and moved the platform 530 upwardly, a relief valve 550 of hydraulic cylinder 546 will be opened such that the hydraulic fluid contained therein will be released. As the hydraulic fluid within the hydraulic cylinder 546 exits therefrom, the piston rod 548 will retract within the hydraulic cylinder 546 from the weight of the platform 530 pushing downwardly thereon. In this respect the weight of the platform 530 will allow the platform 530 to fall downwardly toward the ground 528. As the platform 530 moves downwardly toward the ground 518, the drive gears 534 will rotate thereby producing electricity in the generator 544, as previously explained.

As previously mentioned, the period of vehicles traveling over the system 10 may vary. Accordingly, the force stand 500 is operative to continuously generate electricity even though a vehicle may not be driving over the system 10. Specifically, the relief valve 550 will open only when a vehicle is not driving over the system. As a vehicle 12 moves over the system 10, the relief valve 550 will be closed such that the piston rod 548 will travel upward and move the platform 530 upward and produce electricity. After the vehicle 12 has exited the system 10, the relief valve 550 will be opened such that the platform 530 will move downward and produce electricity, as previously explained. The operation of the relieve valve 550 may be accomplished via computer control and/or mechanical means, as will be recognized by those of ordinary skill in the art. In this respect, the force stand 500 is operative to continuously produce electricity through the reciprocal up and down movement of the platform 530, even though there may be pauses between the vehicles 12 traveling over the system 10.

Figure 13:
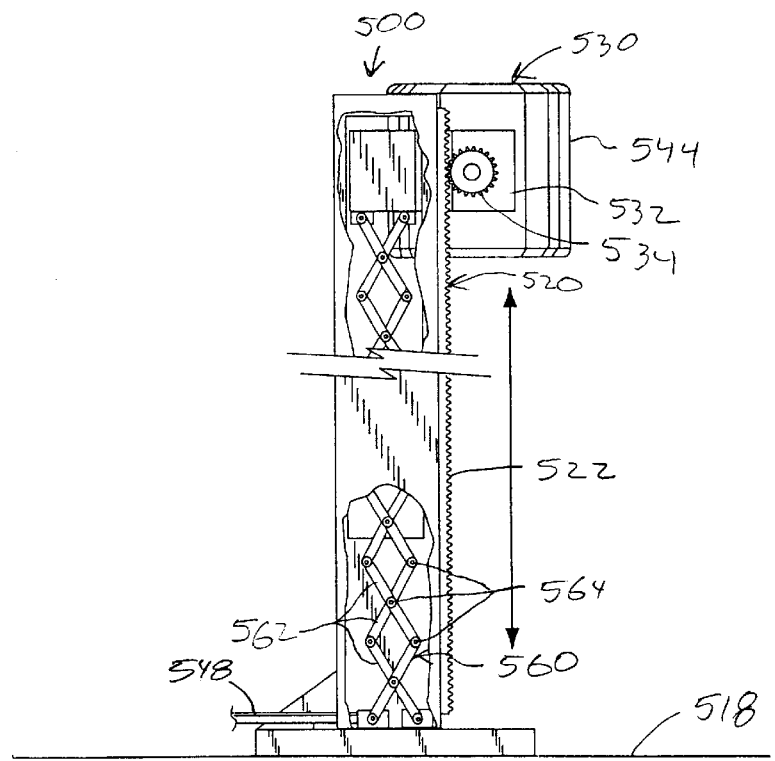
FIG. 13 is a side elevational view of the force stand shown in FIG. 10; and using a scissor lift.

Referring to FIG. 13, a scissor lift 560 may be used to translate the platform 530 up and down. Specifically, the scissor lift 560 is disposed within first vertical beam 512 and attached to the platform 530 at an upper end thereof. The scissor lift 560 is hingedly attached to the platform 530, as seen in FIG. 12. The scissor lift 560 comprises multiple arms 562, hingedly attached to one another at joints 564. In this respect, as the arms 562 are brought toward one another, the total length of the scissor lift 560 will extend. Similarly, as the arms 562 are moved away from each other the total length of the scissor lift 560 will retract thereby lowering the platform 530.

The lower arm 562 of the scissor lift 560 is rotatably attached to the piston rod 548 of hydraulic cylinder 546, as seen in FIG. 12. As the movement of the piston rod 548 from the hydraulic cylinder 546 pushes the lower arm 562 the scissor lift 560 extends upwardly. Similarly, when relief valve 550 is opened, the weight of the platform 530 exerted on scissor lift 560 will cause the scissor lift 560 to retract such that the platform 530 will move downwardly. The scissor lift 560 will provide mechanical leverage in elevating the platform 530 thereby maintaining the efficiency of the force stand 500. It will be recognized that the scissor lift 560 may comprise multiple arms 562, as desired.

It will be recognized by those of ordinary skill in the art, that the platform 530 may be disposed on a single vertical beam 512, without the second vertical beam 516. In this respect, the single vertical beam 512 will support both the gear box 538 and generator 544 disposed on platform 530. Additionally, a second hydraulic cylinder 546 or scissor lift 560 may be disposed within the second vertical beam 516 in order to facilitate movement of the platform 530 in the upward direction. Furthermore, it is possible to use other types of fluid rather than hydraulic fluid for the force stand 500.

Additionally, it will be recognized that by using two force stands 500 it is possible to continuously produce electrical energy. Specifically, a energy producing platform 530 of the first force stand 500 will be propelled upwardly, while the energy producing platform 530 of the second force stand 500 will be moving downwardly. Therefore, the pressurized hydraulic fluid from conduit 20 will be directed to the force stand 500 which needs its platform 530 propelled upwardly. As such, electricity will only be produced by the downward movement of a respective platform 530 of a respective force stand 500. By utilizing two force stands 500, it is possible to continuously produce electricity because one platform 530 will be propelled upwardly, while the second platform 530 will be allowed to fall downwardly thereby producing electricity. By oscillating the production of electrical energy between the two force stands 500, it is possible to continuously produce electrical energy from the movement of vehicles.

Furthermore, it will be recognized that a hydraulic cylinder 546 or scissor lift 560 is not the only method of propelling the energy producing platform 530 upwardly. Specifically pulleys and cable may also be used to translate energy producing platform 530 upwardly. In this respect, the pulleys and cable may facilitate the upward movement of the platform 530.

Figure 3:
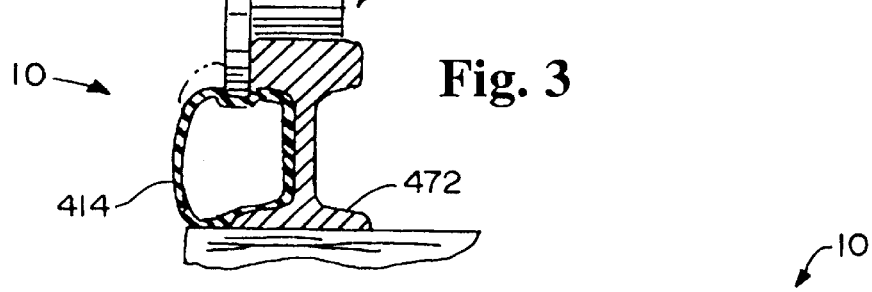
FIG. 3 is a partial cross-sectional view of an electrical energy producing platform system constructed in accordance with a fourth embodiment and for use in conjunction with trains.

Referring now to FIG. 3 showing a fourth embodiment the system 10 produces electrical energy from the movement and weight of a railroad locomotive and its associated cars. A wheel 470 of a locomotive or railroad car travels on a rail 472 of a railroad track. An inboard retainer flange 474 protrudes downwardly from wheel 470 to maintain the wheel 470 and therefore the railroad car on rail 472. Disposed inboard of rail 472 is a compressible bladder 414 similar to the type used in the first and second embodiments of the system 10. The bladder 414 is formed such that it protrudes slightly above the bottom most portion of flange 474 as shown by the dotted line in FIG. 3. Therefore, as a locomotive or railroad car travels over bladder 414, the flange 474 compresses bladder 414 downward. As bladder 414 is compressed, it pressurizes and circulates hydraulic fluid to circulation assembly 18 in fluid communication with bladder 414 to generate electrical energy as previously described above. In fact, it is possible that the hydraulic fluid compressed within bladder 414 may be in fluid communication with the force stand 500 such that it is possible to continuously produce electrical energy even though the bladder 414 is only compressed by the wheels of the locomotive or railroad car.

As will be recognized in the fourth embodiment of the system 10, a plurality of bladders 414 disposed linearly inboard of rail 472 may be interconnected by a manifold in order to produce electrical energy. Alternatively, a single bladder 414 may comprise multiple compartments or cells interconnected to one another through the use of a manifold or other similar device in order to facilitate the circulation of hydraulic fluid and the production of electrical energy therefrom. Therefore, the power generation features of the fourth embodiment are similar to the first and second embodiments wherein the bladder 414 pressurizes and circulates hydraulic fluid to circulation assembly 18 to produce electrical energy from the movement of the train. Additionally, it is contemplated that both rails of a railroad track may be equipped with the energy producing platform system 10 in order to produce electricity form the wheels on both sides of the train.

It will be recognized by those of ordinary skill in the art, that it is not necessary that hydraulic fluid by used within the first, second, third, and fourth embodiments of the system 10. Any type of fluid (i.e., liquid or gas) is capable of operating the system 10 and producing energy. Additionally, any type of fluid is capable of operating the force stand 500 in order to continuously produce electrical energy. In this regard, the fluid is operated upon by the vehicle 12 in order to produce electrical energy. Hydraulic fluid is used as an example of one such type of fluid, but in no way is limiting.

Additional modifications and improvements of the present invention may also be apparent to those of ordinary skill in the art. Thus, the particular combination of parts described and illustrated herein is intended to represent only a certain embodiment of the present invention, and is not intended to serve as a limitation of alternative devices within the spirit and scope of the invention.

What is claimed is:

1. A force stand for an energy platform system operative to generate electrical energy from the weight of a moving vehicles, the force stand comprising:

a vertical beam;

an electricity producing stage movably attached to the beam, the translation of the stage on the beam operative to produce electrical energy; and a drive assembly mechanically coupled o the stage and the energy platform system, the drive assembly being configured to translate the stage upwardly on the beam as the vehicle moves over the energy platform system and translate the stage downwardly when the vehicle is not moving over the energy platform system;

wherein the stage produces electricity as the stage is translated both upwardly and downwardly on the vertical beam in order to produce a constant flow of electricity.

2. The force stand of claim 1 wherein the drive assembly is a hydraulic cylinder.

3. The force stand of claim 1 wherein the drive assembly is a scissor lift.

4. The force stand of claim 3 wherein the scissor lift includes a hydraulic cylinder mechanically coupled to the scissor lift and the energy platform system, and operative to extend the scissor lift.

5. The force stand of claim 1 wherein the electricity producing stage comprises:

a gear mechanism mechanically coupled to the vertical beam; and a generator attached to the gear mechanism and operative to produce electricity from the movement of the gear mechanism.

6. The force stand of claim 5 wherein the gear mechanism comprises:

a gear mechanically coupled to the vertical beam; and a gear box attached to the gear and the generator such that as the stage translates upwardly and downwardly on vertical beam, the gear rotates thereby turning the generator via the gear box.

7. The force stand of claim 6 wherein the vertical beam comprises a gear rack cooperatively engaged to the gear.

8. The force stand of claim 7 wherein the gear rack comprises a set of teeth and the gear comprises a set teeth formed complementary to the teeth of the gear rack such that the teeth of the gear cooperatively engage the teeth of the gear rack.

9. A method of storing energy with a force stand from an energy platform system operative to pressurize a fluid from the weight of a moving vehicle, the method comprising:

a) driving the vehicle over the energy platform system to pressurize the fluid;

b) translating an electricity producing stage of the force stand upwardly on a vertical beam by the pressurized fluid;

c) generating electricity as the stage moves upward on the vertical beam;

d) translating the stage downwardly when the vehicle is not driven over the energy platform system; and e) generating electricity with the stage as the stage moves downward on the vertical beam.

10. The method of claim 9 further comprising the step:

f) repeating steps (a)–(e) for subsequent vehicles driven over the energy platform system.

11. The method of claim 9 wherein steps (c) and (e) comprise generating electricity with an electrical generator of the stage.

12. The method of claim 9 wherein step (b) comprises translating the stage upwardly with a hydraulic cylinder.

13. The method of claim 9 wherein step (b) comprises translating the stage upwardly with a scissor lift.

14. The method of claim 9 wherein steps (c) and (e) comprise generating electricity by rotating a gear of the stage against a beam of the force stand.

* * * * *